Patented Feb. 13, 1951

2,541,851

UNITED STATES PATENT OFFICE 2,541,851

PROCESS FOR MAKING PUTTYLIKE ELASTIC PLASTIC, SILOXANE DERIVATIVE COMPOSITION CONTAINING ZINC HYDROXIDE

James G. E. Wright, Schenectady, N. Y., assignor to General Electric Company, a corporation of New York No Drawing. Application December 23, 1944, Serial No. 569,647

2 Claims. (Cl. 260—37)

The present invention relates to novel compositions of matter comprising a dimethyl silicone. It is particularly concerned with novel compositions which because of their unusual properties may best be described as "bouncing putties."

The invention is based on the discovery that compositions possessing a unique combination of properties including both a high degree of elasticity or "bounce" under suddenly applied stresses and a high degree of plasticity when the stress is applied more slowly, can be obtained by treating a dimethyl silicone with a compound of boron, preferably followed by a further treatment of the product with heat, a catalyst, or both. By the term "dimethyl silicone," as used herein, and in the appended claims, is meant the oily methyl polysiloxanes obtained by hydrolysis of a pure or substantially pure dimethyl silicon dihalide or equivalent hydrolyzable dimethyl silicon compound and containing an average of approximately two methyl groups per silicon atom, all or substantially all of the silicone silicon atoms being connected to two methyl groups.

Various compounds of boron including pyroboric acid, boric anhydride, boric acid, ethyl borate and other esters of boric acid, etc., may be employed, the selection of any specific boron compound usually depending on the particular combination of properties desired in the final product. Ordinarily, although not always necessarily, the heat- or catalyst-treated product is kneaded by hand or in a dough mixer or a Banbury mixer to bring out more fully its putty-like properties. If desired fillers may also be incorporated both for the purpose of lowering the cost of the product and to facilitate the kneading or working thereof. In some cases marked improvements in the bouncing qualities of the product have been noted after incorporation of a filler.

In order that those skilled in the art better may understand how the present invention is carried into effect, the following illustrated examples are given:

Example 1

Seventy-five parts by weight of a dimethyl silicone oil is thoroughly mixed with 10 parts of pyroboric acid in a small amount of alcohol and the resultant mixture heated in an oven for 2 hours at 150 degrees C. At the end of this time the mixture is in the form of a quasi-rubbery gel. Forty-five parts of the gel is mixed with 90 parts lithopone and 0.9 part of benzoyl peroxide and worked on rubber compounding rolls until a uniform mass is obtained. An additional 45 parts dimethyl silicone oil and 0.9 part benzoyl peroxide is then added, worked into the mass, and the resultant product heated in an oven at a temperature of 100 to 150 degrees C. for 2 hours. The final product can be worked between the fingers in the same manner as ordinary window putty, and the more it is worked the more putty-like it becomes. The product also exhibits a high degree of elasticity or bounce.

The use of a hydrolyzable alkyl borate or equivalent catalyst provides a convenient way of obtaining a thorough dispersion of the boron compound in the methyl silicone oil. The following example illustrates the preparation of a plastic, elastic composition by use of an ester of boric acid:

Example 2

A mixture of 200 parts of dimethyl silicone oil, 22.5 ethyl borate and 2.3 parts ferric chloride hexahydrate is placed in a suitable container and steam introduced into the mixture for one-half hour in order to hydrolyze the ester. The resultant product is placed in an oven and heated for 2 hours at 150 degrees C. after which it is worked with 10 per cent by weight of finely-divided titanium oxide until the desired putty-like properties have been obtained.

As has previously been indicated the essential ingredients may be used in various proportions to obtain the desired degrees of elasticity and plasticity. Materials other than the boron compound, and dimethyl silicone oil may also be included to further modify the properties of the products. It is believed that the characteristics of the composition described herein arise from a balance between the hydrophilic and hydrophobic groups, and that the novel material which possesses both elastic and plastic properties is probably a two-phase system comprising a highly cross-linked silicone network with hydrophobic methyl groups attached to the silicon and a viscous liquid reaction product of the boron compound and some of the methyl silicone, which hydrophilic reaction product is a continuous phase between and in the interstices of the cross-linked silicone. This theory as to the nature of the compositions of the present invention appears to be supported by the unique combination of properties thereof. The "friction" between hydrophilic and hydrophobic groups is known to be high. As a result of the "friction" between these groups when the materials of the present invention are subjected to a sudden but not sharp blow, as when dropped on a hard surface, the opposing groups are, for all practical purposes, locked so that the material responds as an elastic solid and exhibits a high degree of bounce. Under sharper impacts, as when struck with a hammer, the material behaves even more like a solid and breaks under such an impact with conchoidal fraction. On the other hand, when it is subjected to gradual pressure, as when worked between the fingers, the internal friction can be overcome so that the boron component is able to flow between the meshes of the network structure, thus causing the material to exhibit its characteristic cold-flowing or putty-like properties.

Variations in the quantities of the boron compound, the catalyst, and the period of heat treatment can be employed to alter the relative proportions of the hydrophilic and hydrophobic components of the mass and thus control the elastic and plastic properties of the product. Additional hydrophilic and hydrophobic materials may also be included in the composition for this purpose. For example, a little glycerine, soapy water, a hydroxide such as zinc hydroxide or a filler such as bentonite which contains absorbed water can be worked into a bouncing putty which has the minimum bounce to obtain a marked increase in the bounce or recovery of the material, probably due to an increase in the internal viscosity of the material. When pulled sharply the compositions which have a high internal viscosity snap with little or no elongation.

On the other hand, if oleic acid is added in amounts less than one per cent, the material becomes quite soft, sometimes sticky and the bounce is reduced as the amount of oleic acid is increased. By judicious additions of alternate doses of oleic acid and glycerine, for example, one can modify the properties of the material in either direction. Instead of oleic acid, glyceryl oleate, or other fat or grease may be employed.

The composition of Example 2 possesses good cold-flow with a reasonably good bounce. For some purposes the highest bounce must be desired and this can be achieved by the use of the minimum amount of oleic acid and the addition of hydroxy groups in the form of zinc hydroxide or bentonite. If rubbery properties are also desired as, for example, if the compound is to be drawn out into long threads, the boric acid should preferably be kept under five per cent or the amount of iron catalyst increased as will be explained later.

Example 3

A preferred formula for general purposes is as follows: A mixture of 500 parts of dimethyl silicone, 35 parts pyroboric acid ($H_2B_4O_7$) made by heating boric acid to 150 degrees C. for 2 hours and grinding the product, and 5 parts ferric chloride hexahydrate is heated to 150 degrees with constant stirring. At the end of about six hours the mixture becomes stiff. It may then be placed in an oven and heated for an additional 18 hours. With a powerful stirrer which scrapes well the interior surface of the reaction vessel, the whole operation may be completed in the original vessel and in a shorter time. Different size batches may require different treatments depending upon the size of the vessel, the shape, whether shallow or deep, and the rate and manner of stirring. Small variations in the properties may be compensated for by varying the amounts of the oleic acid and glycerine. Usually, both are desirable for an accurate adjustment of the properties. About 15 per cent of filler, such as lithopone, gives a final product strongly resembling ordinary window putty in appearance. For golf ball centers about 12 per cent by weight of the silicone gum, of either zinc hydroxide or bentonite is satisfactory. The softer grades of the compositions will tolerate as much as 50 per cent of filler without substantial alteration of their elastic and plastic properties thereof.

The above proportions are not critical. Compositions coming within the scope of the present invention have been made when the boric anhydride was used in amounts ranging from 0.05 to 50 per cent by weight based on the weight of the oil. Ordinarily the catalyst, if used, will comprise from 0.1 to 1.0 per cent by weight of the polymeric dimethylsiloxane. Without the iron catalyst, 5 per cent of pyroboric acid or equivalent boron compound will yield a very rubbery putty while 25 per cent or more yields a material of butterscotch consistency but with high bounce with the same heat treatments. The use of benzoyl peroxide instead of the iron salt generally results in compounds which are more sticky. This may be corrected by working a small amount of glycerine into the sticky material. Various inorganic fillers such as ferric oxide, silica, etc., may be employed in place of or in addition to the fillers mentioned hereinbefore.

An alternative method of preparing these elastic, plastic compositions comprises the hydrolysis of a dimethyl silicon dihalide such as the dichloride by floating the silicon compound on a solution of borax. Sufficient of the boron compound or its product of reaction with the hydrolyzed silicon halide is formed in the hydrolysis product so that on further treatment of the gelled hydrolysis product at elevated temperatures in the presence or absence of a catalyst, as described hereinbefore, bouncing putties of various degrees of elasticity and plasticity can be obtained.

A novel use to which the materials of this invention can be put is a therapeutic one. In the past, it has been customary to require patients in need of hand exercise to throw and grasp balls, but they soon tire of this. The bouncing putty offers an attractive exercising means. Since these compositions can be rolled into balls, bounced, pulled out into strings, made to pop like "bubble gum" and used to take impressions of various objects as well as newsprint, the patients interest does not lag during the rehabilitation period, as with prior exercising devices. Acoustical uses are suggested by the fact that the materials block low frequencies but not high frequencies. Because of their low vapor pressures, they may be used as filling compounds and as high temperature seals for vacuum joints. Many of the compositions are ideally suited for use as type cleaners for typewriter type and the like.

What I claim as new and desire to secure by Letters Patent of the United States is:

1. The process which comprises (1) heating a mixture comprising (a) liquid polymeric dimethylsiloxane obtained by hydrolyzing a substantially pure dimethyl silicon compound containing two hydrolyzable groups and (b) from 5 to 25 per cent, by weight, based on the weight of the polymeric dimethylsiloxane, of a compound of boron selected from the class consisting of pyroboric acid, boric anhydride, boric acid, borax, and hydrolyzed esters of boric acid, the said heating being continued until a solid, elastic product is obtained, (2) adding a finely divided inorganic filler to the solid elastic product and 12 per cent, by weight, zinc hydroxide, based on the weight of the solid polymeric dimethylsiloxane, and (3) kneading the composition of (2) until a putty-like, elastic, plastic product is obtained.

2. The process which comprises (1) heating a mixture comprising (a) liquid polymeric dimethylsiloxane obtained by hydrolyzing substantially pure dimethyldichlorosilane, (b) from 5 to 25 per cent, by weight, pyroboric acid, and (c) from 0.1 to 1 per cent, by weight, ferric chloride hexahydrate, (b) and (c) each being based on the weight of the polymeric dimethylsiloxane, the said heating being continued until a solid elastic product is obtained, (2) adding a finely divided inorganic filler to the solid elastic product and 12 per cent, by weight, zinc hydroxide, based on the weight of the solid polymeric dimethylsiloxane, and (3) kneading the composition of (2) until a putty-like, elastic, plastic product is obtained.

JAMES G. E. WRIGHT.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,371,068 | Rochow | Mar. 6, 1945 |
| 2,375,998 | McGregor | May 15, 1945 |
| 2,384,384 | McGregor et al. | Sept. 4, 1945 |
| 2,389,477 | Wright et al. | Nov. 20, 1945 |
| 2,392,713 | Wright et al. | Jan. 8, 1946 |
| 2,431,878 | McGregor et al. | Dec. 2, 1947 |
| 2,448,756 | Agens | Sept. 7, 1948 |

FOREIGN PATENTS

| Number | Country | Date |
|---|---|---|
| 549,081 | Great Britain | Nov. 5, 1942 |